July 31, 1934.                L. D. CRAINE                1,968,071
                       MATERIAL HANDLING DEVICE
              Filed Sept. 16, 1931        4 Sheets-Sheet 3
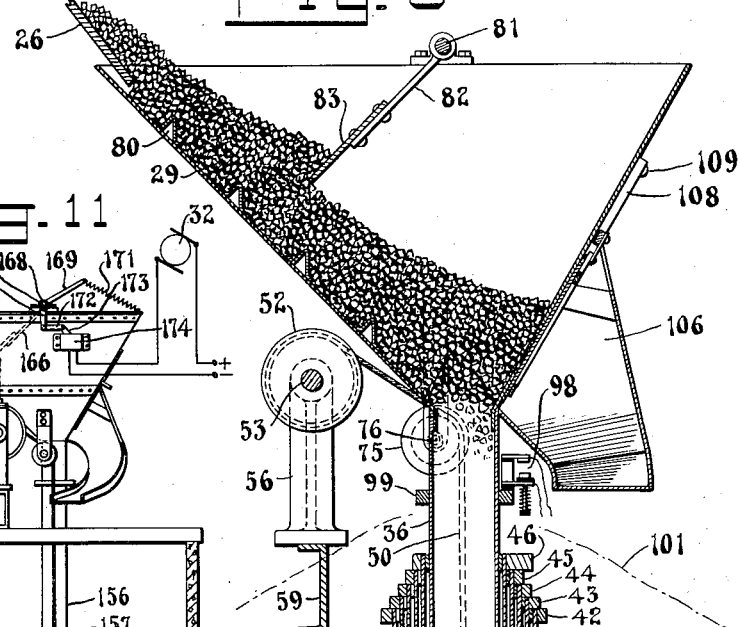
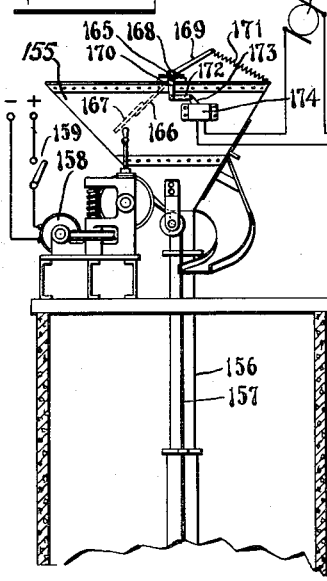
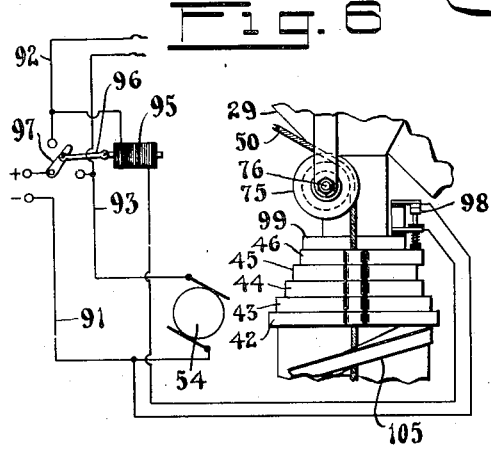
INVENTOR
Leo D. Craine
BY
Bohbber + Ledbetter
ATTORNEYS

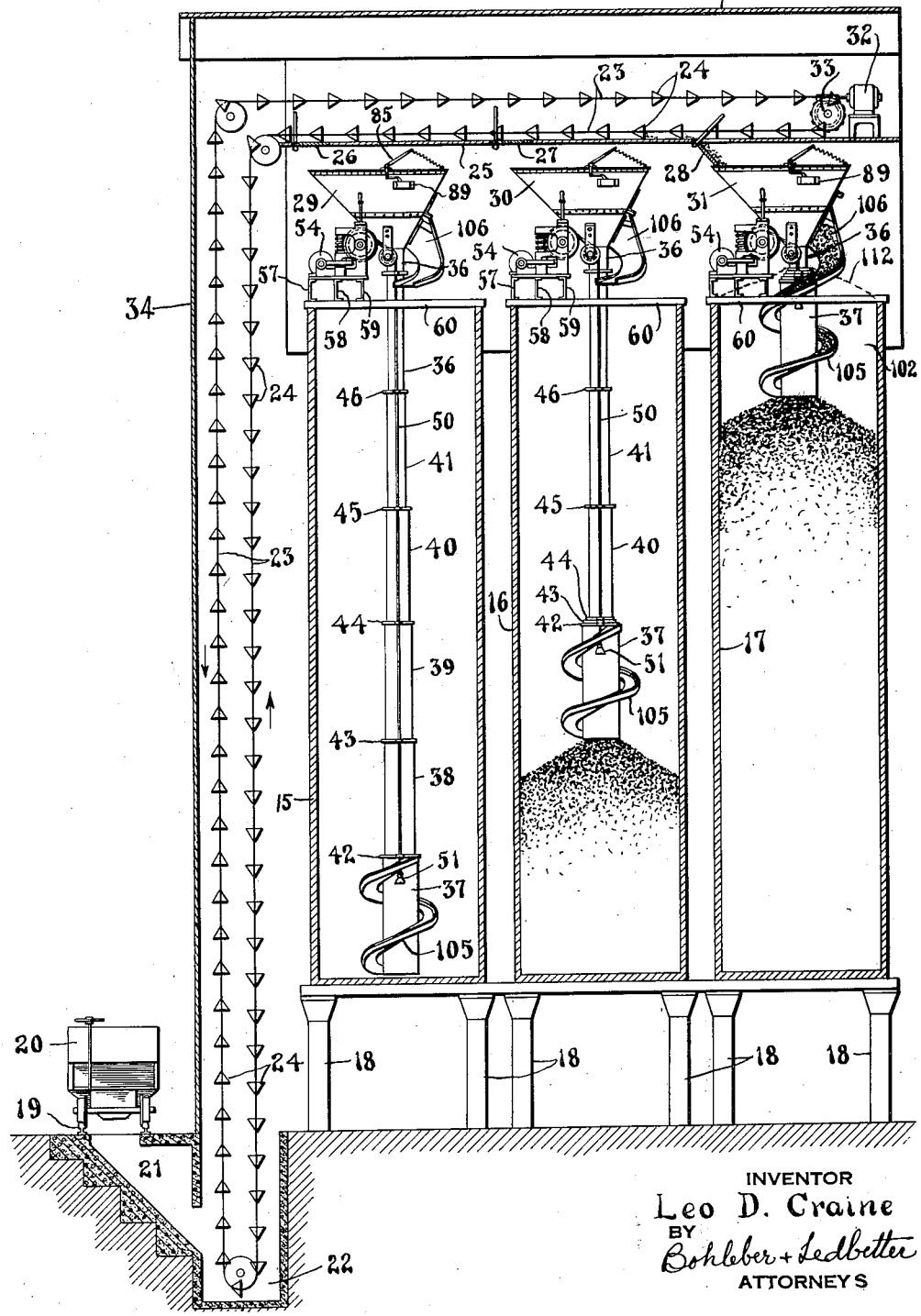

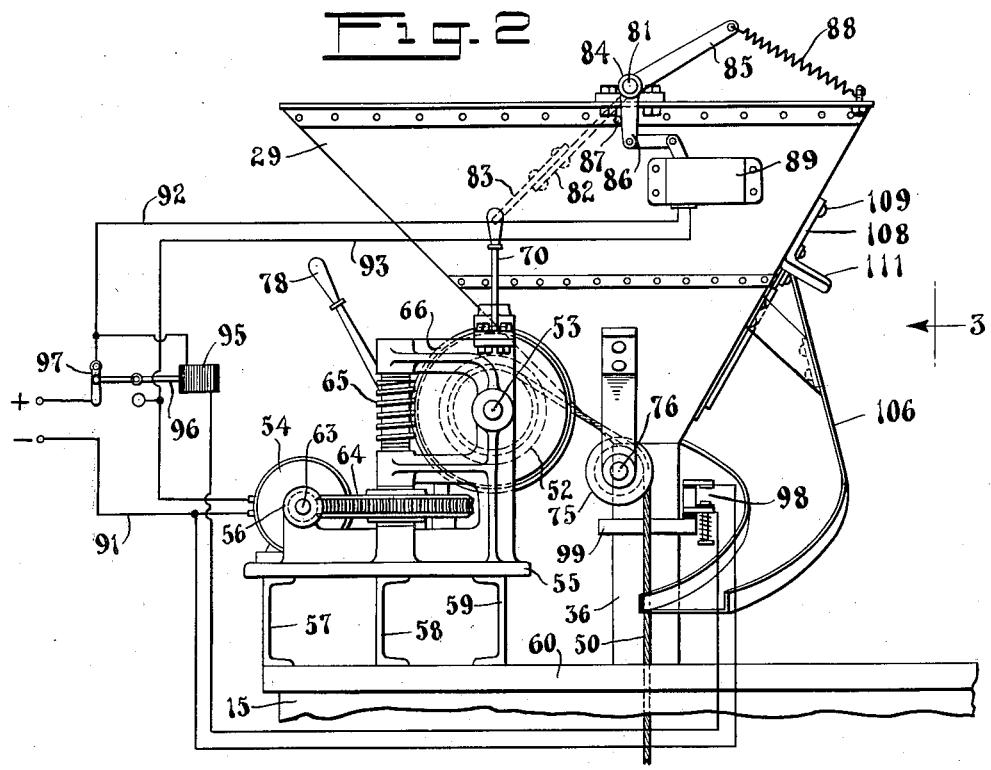
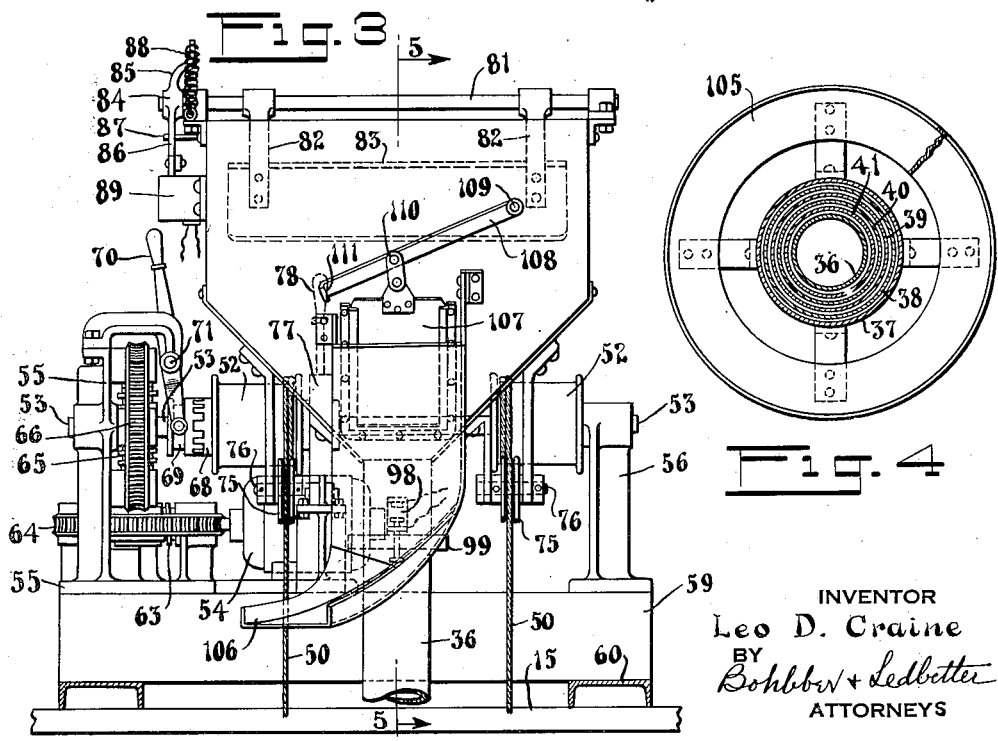

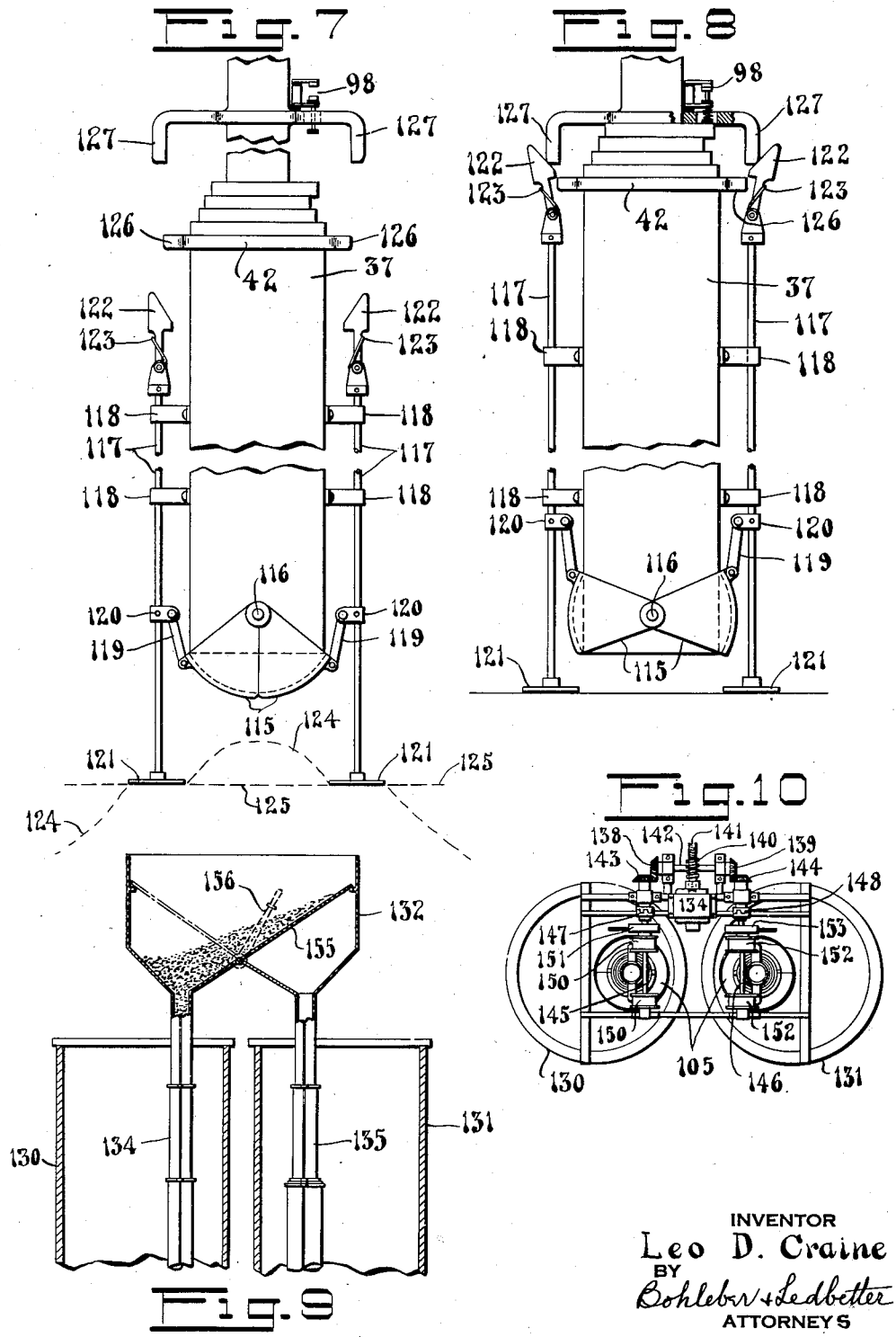

Patented July 31, 1934

1,968,071

UNITED STATES PATENT OFFICE 1,968,071

MATERIAL HANDLING DEVICE

Leo D. Craine, Sherburne, N. Y.

Application September 16, 1931, Serial No. 563,028

9 Claims. (Cl. 214—16)

This invention relates to the method and equipment for handling various kinds of frangible material, such as coal, coke or stone and to store it in bins, silos, pockets, or in piles of substantial heights, without breaking, pulverizing, crushing or causing the material to undergo other forms of degradation in the storage thereof.

Particularly, my invention resides in the production of an apparatus adapted to be readily standardized and economically installed on existing bins, silos, coal pockets and the like with a minimum of installation expense as well as being adapted for use in the construction of new storage equipment of the kind described herein.

One of the more important features of my invention comprises a material handling device adapted to convey material to a hopper at the top of a storage pocket and discharge said material from the hopper to the pocket through a telescopic chute, in combination with means controlled by material in the hopper to enable the material to be discharged from said hopper by said chute as fast as it is conveyed thereto by said conveyor.

An important object of my present invention is to construct a material handling device comprising, in combination, a storage pocket provided with a telescopic chute suspended therefrom, in combination with means actuated by the material in the hopper for raising the chute.

Another object is to produce equipment adapted to receive coal or coke in a hopper at the top of a silo or pocket and thereafter to lower or transfer said material from the hopper to the pocket by causing it to flow either continuously or intermittently into said pocket, irrespective of the distance between the hopper and level of the coal in the pocket.

Another object is to provide means for automatically elevating the mouth of a telescopic chute or tube to discharge material therefrom at substantially the same rate of speed as more of such material is fed into the end of the chute remote from the mouth.

Another object is to provide means for depositing material at the top of a pocket, and around a telescopic chute disposed therein, whereby more material may be stored in the pocket than can be delivered and deposited therein through said telescopic chute.

Another object is to construct a material pocket, of the class described, comprising means for elevating a telescopic chute and means for rendering said elevating means inoperative, when the lowermost section of said chute is elevated to its uppermost position in said pocket.

Another object is to provide means for closing the end of a telescopic chute and means for elongating the chute, or lowering the end thereof, to reach the bottom of a pocket as material is deposited into the top thereof whereby the chute is filled with material as it is elongated or lowered to the bottom of the pocket, and means for rendering the chute closure inoperative when the chute reaches the end of its downward movement, and means for maintaining said closure inoperative until the tube is again elevated to the top of the pocket.

Another object is to provide, in a device of the class described, means for opening the closure at the end of a telescopic chute when said chute reaches the bottom of a pocket, in combination with means for retaining said closure in open position while the chute is being elevated to the top of the pocket and means for automatically releasing said closure when the chute reaches the top of the pocket.

Another object is to construct a storage pocket comprising in combination a hopper, a telescopic chute and a spiral chute adapted to fill the pocket brimful of a frangible material and deposit a surcharge thereon.

Another object is to provide equipment of the class described, comprising a pair of pockets and a pair of telescoping chutes, in combination with means for filling said pockets and tubes from a common hopper, and other mechanism common thereto.

These and other objects of my invention and the means for their attainment will become apparent from the following description of my invention. Referring now to the accompanying drawings, showing one embodiment thereof, Figure 1 is a side elevational view, somewhat diagrammatic and partly in section, showing a group of silos or coal pockets equipped with mechanism for conveying coal and depositing it in a pocket through a hopper and a telescopic chute or tube without permitting the coal to fall into the pocket and become crushed or broken.

Figure 2 is an elevational view of one of the hoppers and the mechanism for elevating or collapsing the telescopic chutes shown in Figure 1, together with means for controlling the operation of the chute elevating mechanism by means of the coal deposited in said hopper.

Figure 3 is a front elevational view of the hopper and chute elevating mechanism as viewed from the left-hand side of Figure 2.

Figure 4 is a sectional view of a collapsible or telescopic delivery chute or tube taken on the line 4—4 of Figure 5.

Figure 5 is a sectional elevation of the hopper and collapsible tube delivery chute taken on the line 5—5 of Figure 3.

Figure 6 is a fragmentary view showing the collars or guide rings on the upper ends of each tube section when the chute is collapsed; the manner in which said rings are guided, by the chute elevating cables, and means for stopping the motor which elevates the chute when said chute reaches its uppermost position.

Figure 7 shows one form of mechanism for closing the end of a telescopic chute to permit it to be filled with coal as it is lowered toward the bottom of the pocket and means for opening said closure when the chute reaches the bottom of the pocket or a pile of coal.

Figure 8 is another view of the mechanism shown in Figure 7, and illustrates the position of said mechanism when the tube reaches the top of the pocket and the closure mechanism is about to be released to close the end of the chute.

Figures 9 and 10 show a pair of coal pockets each provided with a telescopic chute, a hopper, common to said chutes, and common means for operating one or the other of said chutes to fill said pockets as desired.

Figure 11 shows an elevational view of one of the hoppers and means for elevating a telescopic chute, connected thereto, together with means for controlling the operation of the conveyor mechanism according to the quantity of material delivered to the hopper.

In describing my present invention, I shall do so in connection with pockets, bins or silos adapted to receive and store coal or coke, because its application in this particular field seems to lend itself to more extensive use, although it should be understood that said invention is also applicable for handling or storing other kinds of material. Moreover, I do not desire to limit my invention to the specific structure illustrated and described herein because it is obvious that such a structure is susceptible of modification without departing from the spirit of my invention or exceeding the scope of the appended claims.

Referring now to the drawings in which numerals are employed to designate corresponding parts throughout several views, it will be seen that Figure 1 illustrates a plurality of coal pockets numbered 15, 16 and 17. These pockets are constructed upon pillars 18 so as to elevate them above the ground and so that material may be delivered therefrom by being dropped or permitted to flow by gravity in the usual way into wagons or trucks disposed thereunder. While the pockets 15, 16 and 17 may be constructed in various ways it seems preferable to construct them near a railroad siding 19 on which coal cars 20 may be set off over a track hopper 21—22 through which coal may be dumped to a level below the siding. An endless conveyor 23, having buckets 24, is provided for elevating the coal from the track hopper 21—22 to a trough 25 disposed above the coal pockets. Gates 26, 27 and 28 are provided in the trough 25 through which the coal is discharged into pocket hoppers 29, 30 and 31, mounted in any suitable manner, above the pockets 15, 16 and 17, respectively, when one or the other of said gates is opened.

Inasmuch as the means, per se, for elevating or delivering coal to the top of the coal pockets forms no part of my present invention, it appears to be unnecessary to describe it in further detail, except to state that the conveyor 23 is adapted to be driven in any well known manner, such for example, as by a motor 32, adapted to drive a sprocket wheel 33, and that the conveyor may be and usually is constructed and adapted to operate in a suitable enclosure 34 adapted to protect both the material and equipment from the elements. It will also be understood by those skilled in the art, that the conveyor 23 may be constructed and adapted to operate in a direction opposite to that indicated by the arrows by reversing the buckets 24 and making the usual provision for locating the trough 25 above the line of buckets returning to the track hopper 21—22 instead of below them, as illustrated in Figure 1.

I provide means for loading coal into the pockets from the hoppers through a telescopic chute or tube, which I shall designate generally by the numeral 36. The chute 36 is constructed of a plurality of tubular sections 37, 38, 39, 40 and 41 adapted to fit into one another, as shown in Figure 5, and to be collapsed or telescoped by means to be presently described. Guide rings 42, 43, 44, 45 and 46 are secured to the top of the chute sections 37, 38, 39, 40 and 41, respectively, and are preferably constructed to extend beyond the outside and inside surfaces of said sections so as to cooperate one with another; and also with rings 47, 48, 49, 50 and 51 secured at the bottom, and to the outside surfaces, of chute 36, 38, 39, 40 and 41, respectively. From the structure just described it will be seen that the chute 36 is adapted to be elongated by extending or sliding the sections thereof with respect to one another. In other words, the chute section, or tube 41 is adapted to slide with reference to the tube 36 until the ring 46, on the top of the tube 41, engages the ring 47 at the bottom of the tube 36; similarly the tube 37 is adapted to slide with reference to the tube 38 until the ring 42, on the top of the former, engages the ring 48 on the bottom of the latter; and similarly for each pair of tube sections, until the chute 36 is completely extended or lowered to the bottom of the pocket or top of the pile of coal in the pocket, see Figure 1.

It is apparent that when the tube 36 is extended, it may be collapsed by merely elevating the section 37, because as section 37 is elevated the ring 42 engages the ring 43 and elevates the section 38, and similarly the ring 43 is adapted to successively elevate the sections which are secured to the rings 44, 45 and 46, respectively, see Figure 5.

Referring again to Figure 1, if we assume that the chute 36 in the pocket 15 is full of coal, it will be apparent that, when the mouth of the chute, or in other words, section 37, is elevated slightly above the bottom of the pocket, by upwardly collapsing the chute, that coal will flow gently from the mouth, or bottom of the chute, into the pocket as long as there is clearance enough, between said mouth and the top of the coal pile to permit such flow. The chute 36 is kept full of coal at all times by adding more coal at the top as the sections of the chute are successively elevated to discharge the coal from the bottom. By this means, coal is gently lowered through the chute and piled into the pocket without being dropped or tumbled from any appreciable distance during its travel from the hopper at the top of the coal pocket to the pile of coal therein. The chute 36 may be collapsed or telescoped in any suitable manner and by any suitable means which is susceptible of being controlled in a manner to be hereinafter described. In the present embodiment of my invention, I provide for elevating the chute 36 by means of cables 50, secured to each side of the section 37, as at 51, by winding the cables 50 on drums mounted at the top of the pockets. Referring now to Figures 2 and 3, it will be seen that I provide for lifting the cables 50 by a winch, comprising a pair of drums 52 52 adapted to freely rotate as a unit on a shaft 53 which shaft is rotated by a motor 54, connected thereto, through suitable speed reduction gearing to be presently described. The motor 54, and drums 52 are constructed as a unit, to facilitate the installation thereof and are here shown as mounted in a frame or base 55 adapted to cooperate with a bearing 56 in supporting the shaft 53. The base 55 and bearing support 56 are mounted at the top of the coal pocket on structural shapes such as channels 57, 58, 59 and 60 suitably positioned thereon and secured thereto. The motor 54 drives the drums 52 through a worm 63, a worm wheel 64, a second worm 65, mounted to rotate with the worm wheel 64, and a second worm wheel 66, secured to the shaft 53 on which the drums 52 are mounted. Preferably, the drums 52 are integrally connected to a sleeve having one end formed in the shape of a clutch member 68 adapted to cooperate with a complementary shape clutch member 69 splined to the shaft 53 and adapted to be operated longitudinally along said shaft by means of a clutch lever 70 mounted in the base 55 at 71. The cables 50 are adapted to pass around guide pulleys 75 mounted in bearings 76 supported by the hopper and adapted to cause the cables to pull vertically upward on section 37 of the chute 36. A brake 77, mounted between the drums 52, is provided for use in lowering the tube 36 and is adapted to be operated by a brake lever 78.

From the mechanism just described it will be apparent that when the motor 54 is operating, the chute 36 will be gradually elevated or collapsed by the pull on the cables 50 which lifts the section 37 toward the top of the pocket. When it is desired to lower the chute, the operator may do so by disconnecting the clutch members 68 and 69, by means of the lever 70 and allow the chute 36 to descend by gravity; checking the descent as desired by means of brake 77 and 78.

Referring now to Figure 6 it will be seen that the guide rings 42 to 46, both inclusive, are provided with holes through which the cables 50 are adapted to pass so as to enable the cables to guide the sections of the chute and keep them in alignment. Referring to Figure 5, it will be seen that cleats or steps 80 are secured to the surface of the hopper which comes in contact with the incoming material to prevent the material from sliding freely down the surface of the hopper and also to reduce the wear on the hopper. The cleats 80 cause the material which enters the hopper to accumulate on the side of the hopper until the angularity thereof is greater than the angle of repose whereupon the accumulated material will intermittently surge or "avalanche" so to speak, toward the center of the hopper and the opening at the bottom thereof. The advantage of this feature of my invention will be presently described.

Mounted on the top of the hopper, in any suitable manner, is a rock shaft 81, carrying a pair of arms 82 adapted to support a bar or plate 83 in the path of material entering the hopper. Secured to one end of the shaft 81 is a bell crank 84, see Figure 2, having arms 85 and 86. The arm 86 is normally urged against a stop 87 by means of a spring 88 connected between the arm 85 and a fixed point on the hopper. The arm 86 is connected to an electric switch, shown diagrammatically at 89, and is adapted to close a circuit formed by the connectors 91, 92, 93, for supplying current to the motor 54 whenever the quantity of material entering the hopper is sufficient to depress the bar 83 and rotate the bell crank 84 in a counterclockwise direction. When the motor 54 is started it will continue to rotate and through the cables 50, raise the chute 36 as long as the pressure of the incoming material on the plate 83 is sufficient to maintain the switch 89 in closed position. Hence, as a direct result of depositing material in the hopper, material will flow from the chute into the pocket. Simultaneously, material which has accumulated in the hopper will flow into the top of the chute 36 until there is not enough material in the hopper to press against the plate 83 and hold the switch 89 closed; whereupon the spring 88 will open the switch 89 and break the circuit for supplying current to the motor and thereby arrest the elevation of the chute 36 and the flow of material therefrom.

If material is delivered to the hopper at a rate of speed which will keep the switch closed at all times, such material will be continuously lowered through the chute 36 to the pocket. However, as soon as the quantity of material delivered to the hopper is insufficient to press upon the plate 83 the switch 89 opens immediately and the motor stops. When material is again delivered to the hopper by the conveyor 23 it will collect on the cleats 80 and from time to time surge or "avalanche" past the plate 83 until the hopper 29 is filled, as indicated in Figure 5 and the switch 89 is again closed by a surge of material located at a level high enough to actuate the switch 89.

To prevent the motor from operating when the chute 36 is elevated to its uppermost position at the top of the pocket, a solenoid 95, having an armature 96 suitably connected across the conductors 91—92 to a switch 97, is adapted to open the switch 97 when the solenoid is energized. To energize the solenoid 95 I provide a normally open switch 98 mounted upon a collar 99 secured to the chute 36 and adapted to be closed by the upward movement of the ring 46, see Figure 5, whereby current from the connectors 91—92 is momentarily caused to flow through the solenoid to open the switch 97 and thereby open the circuit supplying current to both the motor 54 and the solenoid 95. It is important to provide mechanism for interrupting current supplied to the motor, as just described, because the elevation of the chute 36 is automatically controlled by the quantity of material delivered to the hopper 29 and the mechanism would destroy itself if through inadvertence material were delivered to the hopper and the motor allowed to continue running after the chute 36 reached the top of the pocket.

In the interest of economy it is desirable to make the pockets and charging mechanism, of the class herein described, as compact as possible and at the same time to be able to fill the pockets with material up to the brim of the pocket and even above the brim as indicated at 101 in Figure 5. Material piled on the top of pockets as shown in Figure 5 is called "a surcharge" for reasons which the name implies. It is important to be able to "surcharge" pockets or bins of this kind, because by doing so storage is often economically provided for from eight to ten tons of coal.

Under ordinary conditions it is desirable to mount the charging mechanism on the top of a silo or pocket in a manner such as that shown in Figure 1 by the relationship between the hopper 31 and pocket 17, with the result that the space 102 at the top of the pocket cannot be filled through the chute 36 because when the chute is drawn to its uppermost position in the pocket the mouth thereof is still well within the pocket.

To deposit material at the top of the pocket in the space indicated by the numeral 102, I provide a spiral chute 105 disposed about the section 37 and adapted to register and cooperate with a chute or spout 106 carried on one side of the hopper above the entrance to the chute 36. A gate 107 is provided in the side of the hopper through which material may be conducted to the top of the pocket, through the chutes 105 and 106, and be deposited around the section 37 and in the space 102. Any suitable means may be provided for opening the gate 107, however, such means is here shown as a lever 108 pivoted to the hopper at 109 and which is connected to the gate 107 by a link 110 and adapted to be manually elevated by means of the handle 111. The gate 107 may be closed when material is piled on the top of the pocket to a level such as indicated by the dotted line, at 112, in Figure 1, and then material may be stored in the hopper itself until such time as the pocket is emptied enough to receive it.

I provide for closing the bottom of the chute 36 by means of a pair of doors 115 hinged to the section 37, on trunnions 116. The doors 115 are adapted to close and stay closed by gravity. When the chute 36 is disposed at the top of the pocket, it may be filled with material and gradually lowered under the influence of gravity and the brake 77—78 to the bottom of the pocket. By this means the chute 36 may be filled with coal without dropping the coal the full length of the chute as it would otherwise be necessary to do in starting the mechanism shown in pocket 15 of Figure 1.

I also provide for opening the doors 115, so that the pocket may be filled as the chute is elevated, by means of rods 117 slidably mounted on the sides of the section 37 in guide brackets 118 and connected to the doors 115 through links 119 secured to a fixed fastening 120 pinned to the rods 117. Bumper plates 121 are mounted on the lower ends of the rods 117. Hooks 122, urged toward each other by springs 123, are mounted on the upper ends of the rods 117, respectively. From the mechanism just described it will be understood that as the chute 36 is lowered into the pocket the rods 117 engage either the top of a pile of material, as indicated in Figure 7 at 124, or the bottom of the pocket, as indicated at 125. Moreover, as the chute 36 continues to descend, the rods 117 through the links 119 will open the doors 115. As soon as the doors 115 are completely opened, the hooks 122 engage projections 126 on the ring 42 whereby the doors 115 are held open until the chute 36 is again collapsed and reaches its uppermost position in the pocket whereupon the hooks 122 are cammed out of engagement with the projections 126 by cams 127 secured at the top of the chute 36, see Figure 8, and the doors 115 are again permitted to fall and assume the position shown in Figure 7.

It will be understood that the chute closure mechanism just described and the spiral chute 105 may both be mounted on section 37 as herein described, however, these devices have been illustrated separately in the drawings in the interest of simplicity.

Referring now to Figures 9 and 10 in which I illustrate a modification of the mechanism just described, it will be seen that I contemplate the provision of means for filling two pockets 130 and 131 from a common hopper 132 and provide a single motor 133, see Figure 10, for elevating one or the other of chutes 134 and 135 disposed in the pockets 130 and 131, respectively. While these figures are somewhat diagrammatic it will be seen by referring to Figure 10, that the motor 134 is adapted to rotate a pair of mitre gears 138 and 139 through a worm 140 and a worm-wheel 141 mounted on a shaft 142 to which the gears 138 and 139 are mounted. Mitre gears 143 and 144 are mounted on shafts 145 and 146 which are adapted to be driven by gears 138 and 139 through clutches 147 and 148, respectively. The shaft 145 carries a pair of drums 150 and a brake 151, similar to drums 52 and brake 77 above described. Similarly, the shaft 146 carries a pair of drums 152 and a brake 153.

It will be seen that the motor 134, by means of the mechanism just described, is adapted to drive either one or both pairs of drums 150 or 152 to elevate chutes 134 and 135, respectively. Moreover, it will be understood that a switch mechanism, similar to that described in connection with Figure 5, may be mounted on the hopper 132 for controlling the operation of the motor 134 similar to the manner described for controlling the motor 54. The hopper 132 is provided with a deflector 155 which may be tilted from side to side by a handle 156 to direct coal into either the chute 134 or 135. With the mechanism just described, one or the other of two bins or pockets 130 or 131 may be filled in a manner similar to that above described in connection with the single bin and mechanism associated therewith.

In Figure 11, I illustrate a modification of the mechanism, above described, for practicing my method of discharging material from a hopper through a telescopic chute to a pocket. This modification comprises a pocket hopper 155 having a telescopic chute 156 connected thereto and adapted to be elevated by means of a cable 157. The cable 157 is elevated by a motor 158 and a gear reduction mechanism which need not be particularly described because of its similarity to the mechanism shown and described in connection with Figures 1 and 2 above. Briefly, whenever the motor 158 is connected to an electric circuit supply line by a switch 159, the chute 156 is constantly elevated independent of the amount of material in the hopper. It will be understood that material will be delivered to the hopper 155 by a motor driven conveyor, like that shown in Figure 1 at 23 and 32.

Mounted on the top of the hopper 155, in any suitable manner, is a rock shaft 165, carrying a pair of arms 166, similar to the arms 82 shown in Figure 3. A plate 167 is secured to the arms 166 and disposed in the path of material entering the hopper. Secured to one end of the shaft 165 is a bell crank 168 having arms 169 and 170. The arm 170 is normally urged to the left by a spring 171 extending from the end of the arm 169 to a fixed point on the hopper. A link 172, connects the arm 170 to a switch 173 mounted in a switch box 174. The construction and arrangement of the bell crank 168, spring 171, and link 172 is such that the spring will normally close the switch 173 and cause current to flow to the conveyor motor 32 whereby the conveyor 23 will operate and convey material to the hopper 155. Whenever the quantity of material conveyed to the hopper 155 by the conveyor 23 is sufficient to depress the plate 167 and rotate the bell crank 168 in a counter clockwise direction, the link 172 will open the switch 173, and stop the motor 32 so that the conveyor will no longer deliver material to the hopper 155 as long as the parts occupy the position shown in Figure 11.

It will now be understood that if the chute 156 is constantly elevated by means of the cable 157 and the motor 158 above described, that the material which accumulated in the hopper 155 and which operated the switch 173 to stop the conveyor, will be continuously discharged from the hopper 155 through the chute 156 into the pocket. In time the quantity of material in the hopper will be insufficient to hold the plate 167 in the position shown in Figure 11, and the spring 171 will rotate the bell crank 168 in a clockwise direction, whereby to close the switch 173 and start the conveyor 23 by supplying current to the motor 32. From the mechanism just described it will be seen that the quantity of material delivered by the conveyor to the hopper may be controlled in accordance with the rate at which material is discharged from the hopper by the chute to the pocket.

Having described the operation of each part of my machine in connection with the description of the mechanism employed therein, it seems unnecessary to give a detailed description of its complete cycle of operation. However, it is obvious from the foregoing description that the structure above described is adapted to charge a bin, pocket or silo with frangible material without dropping the material any substantial distance whereby it may become broken, crushed or degraded and attain the other objects hereinbefore enumerated. It will also be obvious that my method of filling a pocket with material may be practiced by providing means for constantly conveying material to a hopper and intermittently elevating a telescopic chute to discharge said material into a pocket; or by constantly elevating a telescopic chute to discharge material into a pocket and controlling the quantity of material conveyed to the hopper by intermittently operating said conveyor.

What is claimed is:

1. Material handling equipment comprising a pocket; a hopper mounted at the top of said pocket; a telescopic chute depending from the hopper and extending into the pocket; electrically operated means for elevating the end of the chute to discharge into the pocket material contained in said chute; and means for connecting said elevating means through a conductor to a source of electrical energy; said connecting means comprising a normally open switch in said conductor and a member adapted to be actuated by material in the hopper for closing said switch.

2. Material handling equipment comprising a pocket; a hopper mounted at the top of said pocket; a telescopic chute depending from the hopper and extending into the pocket; electrically operated means for elevating the end of the chute to discharge into the pocket material contained in said chute; and means for connecting said chute elevating means, through a conductor, to a source of electrical energy; said connecting means comprising, a switch in said conductor; a member adapted to be actuated by material in the hopper, when such material is present therein in predetermined quantities, for closing said switch; and means for opening said switch when the quantity of material in the hopper is less than said predetermined quantity.

3. Material handling equipment comprising a pocket, a hopper mounted at the top of said pocket, a telescopic chute depending from said hopper and extending into the pocket, means for elevating the telescopic chute to transfer material from the hopper through the chute to the pocket, and means for transferring material from the hopper to the pocket after said telescopic chute is elevated to its uppermost position in the pocket, said means comprising a spiral chute mounted on the outside section of said telescopic chute and means for directing material from the hopper to said spiral chute to fill the pocket with material and deposit a surcharge of material thereon.

4. Material handling equipment comprising a pocket, a hopper mounted at the top of said pocket, a telescopic chute depending from said hopper and extending into the pocket, means for elevating said telescopic chute, and means for transferring coal from the hopper to the pocket when said chute is elevated, said last mentioned means comprising a spiral chute mounted on the outside surface of the lower section of said telescopic chute and a spout mounted on the side of the hopper and adapted to register with the spiral chute when the telescopic chute is elevated to the top of the pocket, and means for opening the side of said hopper to permit material to run down the spout and spiral chute into the pocket.

5. Material handling equipment comprising a pocket; a hopper mounted at the top of said pocket; a telescopic chute depending from the hopper and extending into the pocket; means for gradually collapsing the chute to discharge into the pocket material contained therein; and means for rendering said collapsing means inoperative when the chute is completely collapsed.

6. In a material handling device of the class described, a telescopic tubular chute adapted to be lowered into a pocket, means for closing one end of said chute, and means for opening the closing means by lowering the chute into a pocket, in combination with means for retaining said closing means in open position while the chute is being elevated in the pocket and means for rendering said retaining means inoperative when the chute is elevated to the top of the pocket.

7. In a material handling device of the class described, a telescopic tubular chute adapted to be lowered into a pocket, means for closing one end of said chute, and means operable by material in the pocket or the bottom of the pocket for opening said closing means as the chute is lowered into the pocket.

8. In a material handling device of the class described, a telescopic tubular chute adapted to be lowered into a pocket, means for closing one end of said chute, and means operable by material in the pocket or the bottom of the pocket for opening said closing means as the chute is lowered into the pocket, in combination with means for retaining said closing means in open position while the chute is being elevated in the pocket.

9. Material handling equipment comprising a pocket, a hopper mounted at the top of the pocket, mechanism, including a telescopic chute depending from said hopper, for delivering a predetermined quantity of material to the pocket, and means independent of said mechanism for transferring material to the pocket, said means comprising a chute mounted on the telescopic chute, and a spout mounted on the hopper and adapted to register with said chute when said mechanism has delivered said predetermined quantity of material to the pocket, and means for opening the side of said hopper to permit material to run down the spout and chute into the pocket.

LEO D. CRAINE.